United States Patent
Ahn et al.

(10) Patent No.: US 10,313,620 B2
(45) Date of Patent: Jun. 4, 2019

(54) IMAGE DATA OUTPUT DEVICE FOR IMAGE SIGNAL PROCESSOR

(71) Applicant: SK hynix Inc., Gyeonggi-do (KR)

(72) Inventors: Sang Wook Ahn, Gyeonggi-do (KR); Yong Woon Lee, Gyeonggi-do (KR); Huy Chan Jung, Gyeonggi-do (KR); Heui-Gyun Ahn, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 124 days.

(21) Appl. No.: 15/100,501

(22) PCT Filed: Nov. 11, 2014

(86) PCT No.: PCT/KR2014/010804
§ 371 (c)(1),
(2) Date: May 31, 2016

(87) PCT Pub. No.: WO2015/080403
PCT Pub. Date: Jun. 4, 2015

(65) Prior Publication Data
US 2016/0301888 A1 Oct. 13, 2016

(30) Foreign Application Priority Data

Nov. 29, 2013 (KR) ........................ 10-2013-0146822

(51) Int. Cl.
*H04N 5/378* (2011.01)
*H04N 5/341* (2011.01)
(Continued)

(52) U.S. Cl.
CPC ............. *H04N 5/378* (2013.01); *H04N 5/341* (2013.01); *H04N 5/357* (2013.01);
(Continued)

(58) Field of Classification Search
CPC ...... H04N 5/378; H04N 5/347; H04N 5/3559; H04N 5/37457; H04N 5/23293; H04N 5/23216; H04N 5/77
See application file for complete search history.

(56) References Cited

U.S. PATENT DOCUMENTS 5,969,759 A * 10/1999 Morimoto ............ H04N 5/3415
348/311
2004/0012697 A1 * 1/2004 Rossi ................... H04N 5/3537
348/308

(Continued)

FOREIGN PATENT DOCUMENTS

JP     2009-077195     4/2009
KR     1020050039626     4/2005
(Continued)

*Primary Examiner* — Nelson D. Hernádez Hernádez
(74) *Attorney, Agent, or Firm* — IP & T Group LLP

(57) ABSTRACT

The present invention relates to a technology with enables an image signal processor to output image data at a faster speed while using a memory having a smaller capacity. The image signal processor includes a pair of line memories for storing image data output from an analog-digital converter such that the image data alternates in units of horizontal lines, and outputting the stored image data in units of blocks according to a first-in-first-out method.

13 Claims, 2 Drawing Sheets

(51) Int. Cl.
　　　*H04N 5/3745*　　(2011.01)
　　　*H04N 5/357*　　　(2011.01)
　　　*H04N 5/376*　　　(2011.01)
　　　*H04N 5/353*　　　(2011.01)

(52) U.S. Cl.
　　　CPC ......... *H04N 5/3745* (2013.01); *H04N 5/3765* (2013.01); *H04N 5/37452* (2013.01); *H04N 5/37455* (2013.01); *H04N 5/3532* (2013.01)

(56) References Cited

U.S. PATENT DOCUMENTS

| | | | |
|---|---|---|---|
| 2005/0012836 A1* | 1/2005 | Guidash | H04N 3/1562 |
| | | | 348/302 |
| 2005/0068440 A1* | 3/2005 | Gomi | H04N 3/1512 |
| | | | 348/308 |
| 2009/0079859 A1* | 3/2009 | Hagiwara | H04N 9/045 |
| | | | 348/311 |

FOREIGN PATENT DOCUMENTS

| | | |
|---|---|---|
| KR | 100913797 | 8/2009 |
| KR | 1020100096523 | 9/2010 |

* cited by examiner

IMAGE DATA OUTPUT DEVICE FOR IMAGE SIGNAL PROCESSOR

This application is a national stage application of PCT/KR2014/010804 filed on Nov. 11, 2014, which claims priority of Korean patent application number 10-2013-0146822 filed on Nov. 29, 2013. The disclosure of each of the foregoing applications is incorporated herein by reference in its entirety.

TECHNICAL FIELD

The present invention relates to an image data output technology for an image signal processor, more particularly, to an image data output device for an image signal processor that improve an output speed when data, which are sensed by image sensor, are processed and outputted by a block unit.

BACKGROUND ART

In general, an image signal processor (ISP) performs two functions in a camera moving picture capturing mode. One of two functions is to convert mosaic raw data, which is sensed by an image sensor, into red color, green color and blue color (RGB) data to be displayed in a display device such as a liquid crystal display (LCD), and the other of two functions is to convert the mosaic raw data into a compressible YCbCr data and then into a standard image compressed format, e.g., MPEG-4 H.264 and H.265 to store the RGB data.

FIG. 1 is a diagram illustrating an image data output method for a conventional image signal processor.

Referring to FIG. 1, a conventional image signal processor reads image data by a single file unit when the image data, which are sensed by an image sensor 110, are outputted to be stored.

Subsequently, the image data, i.e., image data of X and Y pixel, which are read by the single file unit, are divided into N tile (block) units for one row, i.e., one horizontal line, on a basis of a data array 120, and are sequentially outputted. Such operations are performed repeatedly as much as the number (M) of whole columns.

Thus, in case of outputting image data using the conventional image signal processor, there are demerits to increase cost since a memory having a large capacity is used. Moreover, as a memory having a larger capacity is requested to perform operations for reading and outputting image data, and the image sensor has a high pixel, there are demerits to increase the cost since a memory having a large capacity is needed.

DISCLOSURE

Technical Problem

The present invention is directed to output image data with a fast operation speed using a line memory having a small capacity when the image data of one frame is outputted to be stored.

Technical Solution

In accordance with an embodiment of the present invention, an image data output device for an image signal processor includes a decoder suitable for decoding and outputting image signals, which are sequentially outputted from the pixel array; an analog-digital converter suitable for sequentially converting decoded analog image signals provided from the decoder into digital signals; a pair of line memories suitable for alternately storing image data, which are outputted from the analog-digital converter, by a horizontal line unit, outputting the image data using a first-in-first-out method, and outputting the image data by a block unit; and a multiplexer suitable for sequentially selecting and outputting the image data, which are outputted from the pair of line memories by the block unit.

Advantageous Effects

The present invention may improve a processing speed to store image data in an external device without using a memory element having a large capacity since the image signal outputted from a pixel array are converted into image data and are alternately stored in a pair of line memories by one horizontal line unit.

Moreover, since the image data, which are alternately stored in a pair of line memories, are read and outputted by a block unit through a first-in-first-out (FIFO) method, a processing speed for storing image data in an external device may be improved using a memory element having a smaller capacity.

BEST MODE

Hereinafter, various embodiments will be described below in more detail with reference to the accompanying drawings such that a skilled person in this art understand and implement the present invention easily.

Figure 1:
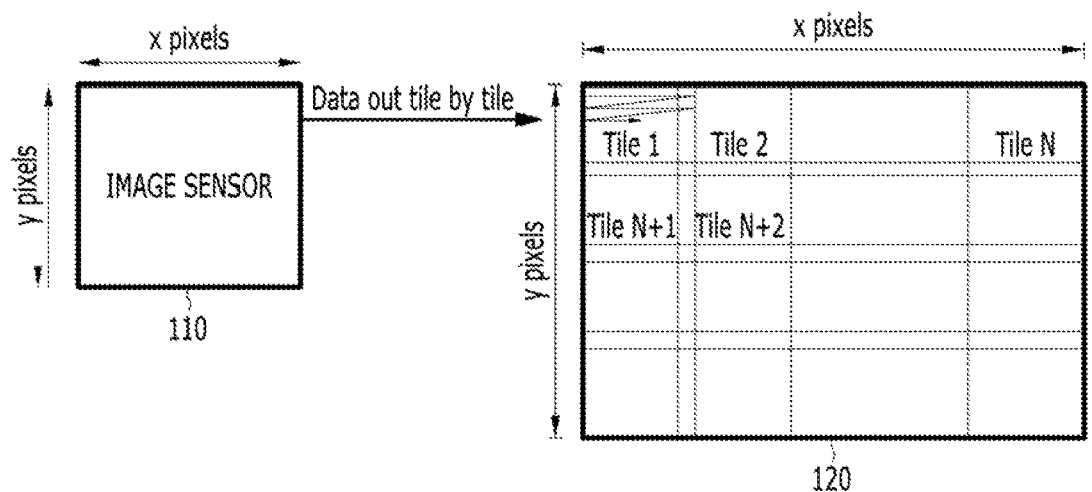
FIG. 1 is a diagram illustrating an image data output method for a conventional image signal processor.
Figure 2:
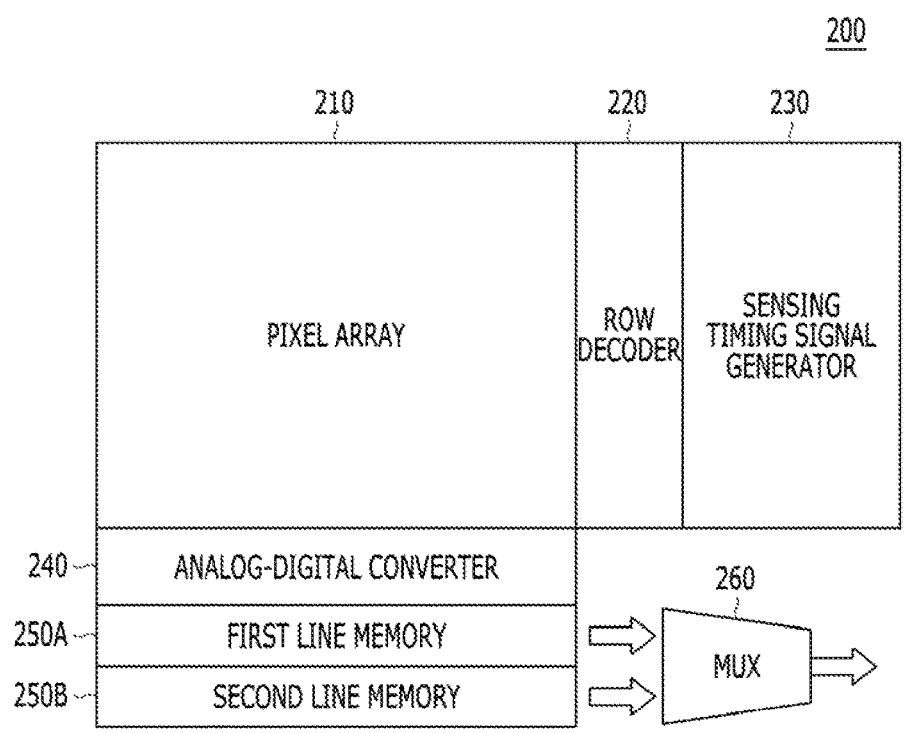
FIG. 2 is a block diagram illustrating an image data output device of an image signal processor in accordance with an embodiment of the present invention.

FIG. 2 is a block diagram illustrating an image data output device of an image signal processor in accordance with an embodiment of the present invention.

Referring to FIG. 2, an image signal processor 200 includes a pixel array 210, a row decoder 220, a sensing timing signal generator 230, an analog-digital converter 240, a first line memory 250A, a second line memory 250B and a multiplexer (MUX) 260.

The pixel array 210 includes a plurality of unit pixels for sensing an image, each of the plurality of unit pixels may include an optical sensor such as a photodiode. The pixel array 210 may be manufactured as a semiconductor chip of an independent type through a manufacturing process of an exclusive use of an image sensor.

A shutter manner for an image sensor applied to a CMOS image sensor (CIS) include a rolling shutter manner and a global shutter manner. In case of the rolling shutter manner, an image signal, which is photoelectrical converted by photo diodes at each row within one frame is transferred to a floating diffusion (FD) at each row which is sequentially selected, and an image signal of a corresponding pixel is outputted. In case of the global shutter manner, an entire image signal, which is photoelectrical converted by all photo diodes within one frame, is simultaneously transferred to the FD and the image signal of the corresponding pixel is outputted at a row, which is sequentially selected.

The rolling shutter manner and the global shutter manner may be applied to the pixel array 210. In case that the global shutter manner is applied to the pixel array 210, as a traditional problem of the rolling shutter manner, a jello effect that a picture is vibrated or a wobbling problem that a picture wobbles may be solved.

The row decoder 220 decodes and outputs an image signal for a first horizontal line (row line) of the pixel array 210 using a sensing timing signal provided from the sensing timing signal generator 230. The row decoder 220 sequentially performs such a decoding operation for the other horizontal lines (row lines).

The row decoder 220 is an embodiment of a decoder in accordance with the present invention, and the present invention is not restricted within this embodiment. A column decoder may be used as a decoder in accordance with another embodiment of the present invention. In case that the column decoder is used, the column decoder decodes and outputs the image signal for a first vertical line (column line) of the pixel array 210 using the sensing timing signal provided from the sensing timing signal generator 230. The column decoder sequentially performs such a decoding operation for the other vertical lines (column lines).

The analog-digital converter 240 sequentially converts and outputs a decoded analog image signal provided from the row decoder 220 into a digital signal. There are several methods that the analog-digital converter 240 converse the analog image signal into the digital signal. For example, analog signals may be simultaneously converted into digital signals for an entire pixel of one row, or analog signals may be converted into digital signals by a column unit, i.e., pixel unit.

The image data outputted from the analog-digital converter 240 are alternately stored in the first line memory 250A and the second line memory 250B by the horizontal line unit on a basis of the pixel array 210 by a control of a control unit (not shown). The image data stored in the first line memory 250A and the second line memory 250B are read out through a FIFO method and read out by a block unit.

The first line memory 250A and the second line memory 250B are logic blocks, and may be manufactured as a semiconductor chip of an independent type through a manufacturing process of a logic exclusive use.

Figure 3:
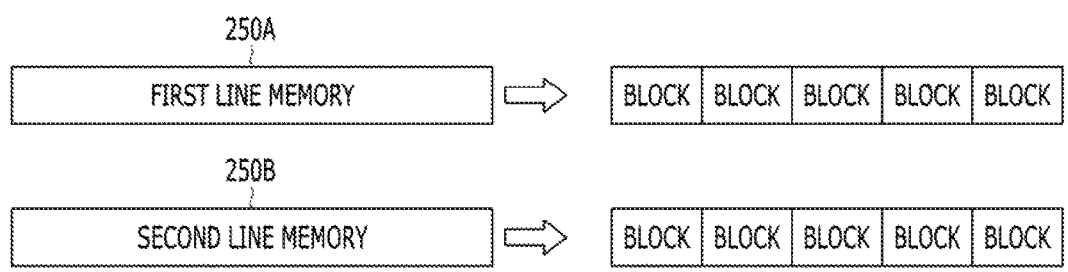
FIG. 3 is a diagram illustrating an image data output method in accordance with an embodiment of the present invention.

Meanwhile, referring to FIG. 3, the detailed description for a storing operation and a readout operation of the image data will follows.

If an output terminal of the analog-digital converter 240 is coupled to a data input terminal of the first line memory 250A, and the image data outputted from the analog-digital converter 240 starts to be stored in the first line memory 250A, and then the image data corresponding to single horizontal line are stored in the first line memory 250A, the output terminal of the analog-digital converter 240 is disconnected from the input terminal of the first line memory.

Subsequently, the output terminal of the analog-digital converter 240 is coupled to the data input terminal of the second line memory 250B, and the image data outputted from the analog-digital converter 240 starts to be stored in the second line memory 250B.

Herein, the image data stored in the first line memory 250A are sequentially read out by the block unit, and the readout image data are transferred to a storage medium through the multiplexer 260.

And then, if the image data corresponding to the horizontal line, which are outputted from the analog-digital converter 240, are stored in the second line memory 250B, the output terminal of the analog-digital converter 240 is disconnected from the data input terminal of the second line memory 250B.

Subsequently, the output terminal of the analog-digital converter 240 is coupled to the data input terminal of the first line memory 250A, and the image data outputted from the analog-digital converter 240 start to be stored in the first line memory 250A.

Herein, the image data stored in the second line memory 250B are sequentially read out by the block unit, and the readout image data are transferred to the storage medium through the multiplexer 260.

When the image data are outputted by the block unit through multiplexer 260, a compensation for preventing a pixel interference, a shading compensation for compensating a color sensitivity difference, or a noise cancelling may be needed. For this, an image signal processor (not shown) may be coupled to the output terminal of the multiplexer 260. The image signal processor (ISP) is a logic block, and may be manufactured as a semiconductor chip of an independent type through a manufacturing process of a logic exclusive use.

Subsequently, the image data outputted from the analog-digital converter 240 are alternately stored in the first line memory 250A and the second line memory 250B as described above and the image data are sequentially read out by the block unit from the line memory that the image data are not stored. And, then the above-mentioned operations are repeatedly performed.

As described above, since the image data outputted from the analog-digital converter 240 are alternately stored in the first line memory 250A and the second line memory 250B by the single horizontal line unit, the processing speed for storing the image data in the external device may be improved without using a memory element having a large capacity.

Also, since the image data, which are alternately stored in the first line memory 250A and the second line memory 250B, are read out by the block unit using FIFO method, the processing speed for storing the image data in an external device may be improved without using a memory element having a large capacity.

In the above-described embodiment of the present invention, two line memories, i.e., the first line memory 250A and the second line memory 250B are used, but the present invention is not restricted in this embodiment. And, more number of line memories may be used and the image data for them may be stored or readout through a same principle.

The capacity of the first line memory 250A and the second line memory 250B is not restricted specifically, but may be variable according to needs. And a signal processing buffer function may be included to improve the quality of the image data outputted from the first line memory 250A and the second line memory 250B.

As described above, an image sensor of a package type may be manufactured by applying a manufacturing technology of a three-dimensional stacked chip package such as a through silicon via (TSV) and a direct bonding interface (DBI) to the pixel array 210, the first line memory 250A, the second line memory 250B and the ISP, which are manufactured as the semiconductor chip of the independent type.

Although various embodiments have been described for illustrative purposes, it will be apparent to those skilled in the art that various changes and modifications may be made without departing from the spirit and scope of the invention as defined in the following claims.

What is claimed is:

1. An image data output device for an image signal processor that dividing and outputting image data of each horizontal line or each vertical line by a plurality of blocks when image data, which are outputted from a pixel array having a plurality of unit pixel for an image sensing, are stored in an external device, comprising:
   a decoder suitable for decoding and outputting image signals, which are sequentially outputted from the pixel array;
   an analog-digital converter suitable for sequentially converting decoded analog image signals provided from the decoder into digital signals;
   a pair of line memories suitable for alternately storing image data, which are outputted from the analog-digital converter, by the each horizontal line on a basis of the pixel array, outputting the image data using a first-in-first-out method, and outputting the image data by a block unit, wherein a first line memory of the pair of line memories includes whole memories corresponding to whole pixels of a first horizontal line of the pixel array and a second line memory of the pair of line memories includes whole memories corresponding to whole pixels of a second horizontal line of the pixel array; and
   a multiplexer suitable for sequentially selecting and outputting the image data, which are outputted from the pair of line memories by the block unit.

2. The image data output device for the image signal processor of claim 1, wherein the pixel array operates using a rolling shutter manner or a global shutter manner.

3. The image data output device for the image signal processor of claim 1, wherein the pixel array is manufactured as a semiconductor chip of an independent type through a manufacturing process of an image sensor exclusive use.

4. The image data output device for the image signal processor of claim 1, wherein the decoder decodes and outputs the image signals using a sensing timing signal provided from a sensing timing signal processor.

5. The image data output device for the image signal processor of claim 1, wherein the decoder is one of a row decoder for decoding and outputting the image signals of a horizontal line, which are sequentially outputted from the pixel array, and a column decoder for decoding and outputting the image signals of a vertical line, which are sequentially outputted from the pixel array.

6. The image data output device for the image signal processor of claim 1, wherein the analog-digital converter simultaneously converts the image signals of analog for an entire pixel of one row provided from the decoder into digital signals, or converts the image signals of analog by a pixel unit.

7. The image data output device for the image signal processor of claim 1, wherein the analog-digital convert simultaneously converts the image signals of analog for an entire pixel of one column provided from the decoder into digital signals, or converts the image signals of analog by a pixel unit.

8. The image data output device for the image signal processor of claim 1, wherein the pair of line memories include a structure having a variable capacity.

9. The image data output device for the image signal processor of claim 1, wherein the pair of line memories include a plurality of pair of line memories.

10. The image data output device for the image signal processor of claim 1, wherein the pair of line memories are manufactured as a semiconductor chip of an independent type through a manufacturing process of a logic exclusive use.

11. The image data output device for the image signal processor of claim 1, wherein the pair of line memories include a signal processing buffer function for improving a quality of the outputted image data.

12. The image data output device for the image signal processor of claim 1, wherein the multiplexer includes an image signal processor for performing a compensation that prevents a pixel interference, a shading compensation that compensates a color sensitivity difference, or a noise cancelling when the image data are outputted by the block unit.

13. The image data output device for the image signal processor of claim 12, wherein the image signal processor is manufactured as a semiconductor chip of an independent type through a manufacturing process of a logic exclusive use.

* * * * *